No. 731,818.

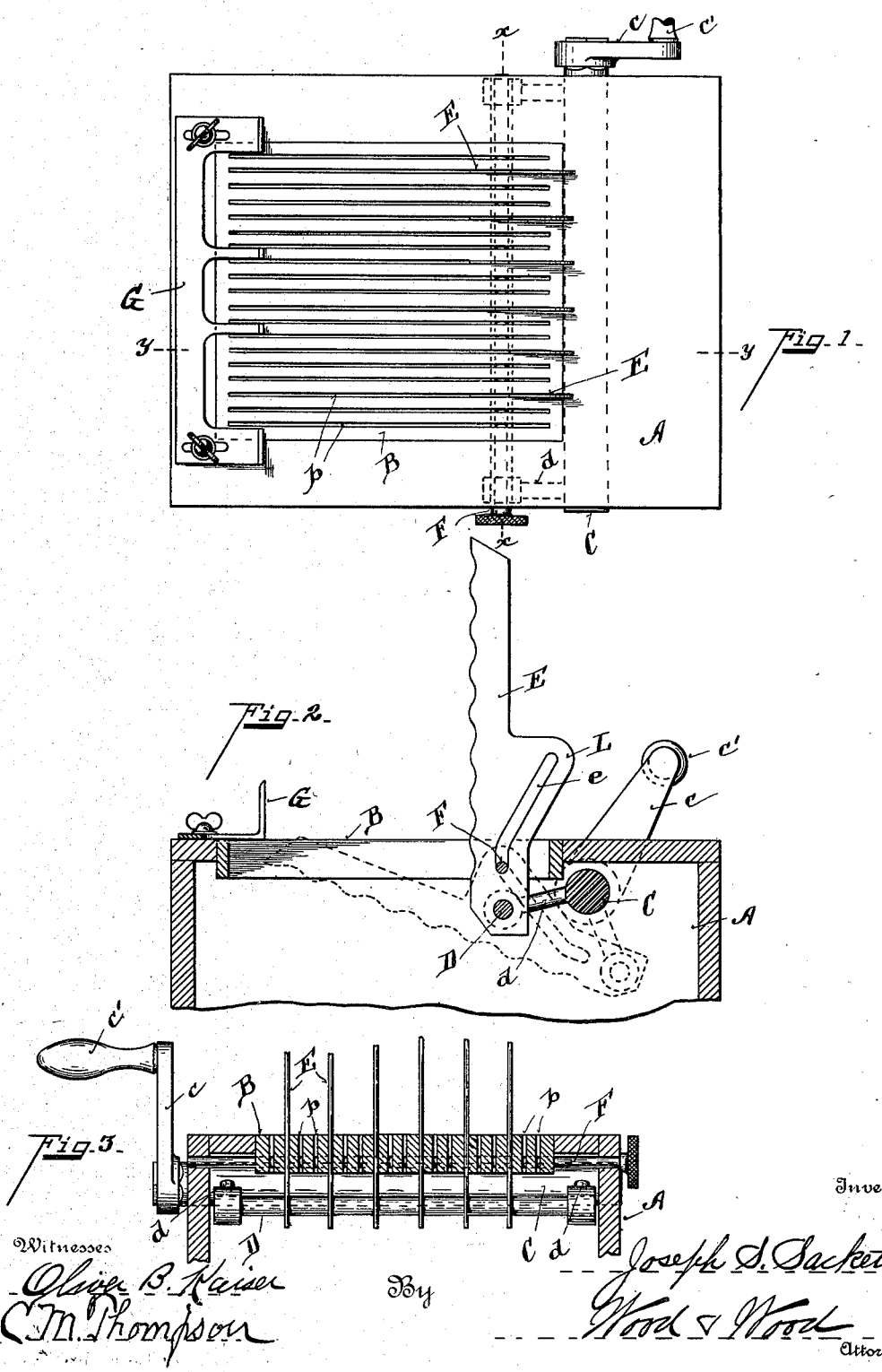

Patented June 23, 1903.

UNITED STATES PATENT OFFICE.

JOSEPH S. SACKETT, OF NEWPORT, KENTUCKY.

BREAD-CUTTER.

SPECIFICATION forming part of Letters Patent No. 731,818, dated June 23, 1903.

Application filed August 11, 1902. Serial No. 119,284. (No model.)

*To all whom it may concern:*

Be it known that I, JOSEPH S. SACKETT, a citizen of the United States, residing at Newport, in the county of Campbell and State of Kentucky, have invented certain new and useful Improvements in Bread-Cutters, of which the following is a specification.

The object of my invention is to provide a device for slicing or cutting bread. Bread being soft and spongy requires to be cut with a thin knife. The crust of bread also wants to be completely severed by the knife, so as to make the slices smooth on the edges to prevent crumbling, which occurs when the crust is broken off instead of being severed.

Another object of my invention is to provide either a single or a multiple number of cutting-blades. When a multiple number of blades are employed, the slices are of a thickness equal to the distance between the blades. I have provided means for varying the thickness of the slices of the bread by the insertion or removal of alternate knives of the series.

The features of my invention will be more fully set forth in the description of the accompanying drawings, forming a part of this specification, in which—

Figure 1 is a plan view of my improved bread-cutter. Fig. 2 is a central longitudinal section on line $y\ y$, Fig. 1, showing the knife in elevation. Fig. 3 is a section on line $x\ x$, Fig. 1.

A represents a hollow-box frame, the top face of which is provided with a series of rails B, set a distance apart just sufficient for the free passage of the knife-blade through the slots $b$, formed by the series of longitudinal rails. The bread or other article to be cut is supported upon these rails.

The cutting instrumentalities consist of the following parts:

C represents a crank-shaft journaled in the frame beneath the series of rails B, which form the cutting-table. $c$ represents a crank fixed to said shaft and provided with a handle $c'$ for oscillating the shaft.

D represents a shaft or rod for supporting and oscillating the knives E, said shaft being secured to the crank-shaft C by connecting-rods $d$ and operated thereby.

E represents one of the series of knives. The heel of said knife is journaled upon the rod D. In the preferred form of construction the knife is provided with an extended portion L, in which is pierced a slot $e$.

F represents a guide-rod rigidly secured to the rails of the table, preferably in the form shown in the drawings.

The knives being free to turn on the rod D must be guided and compelled to pass vertically as well as to give them a drawing motion longitudinally across the loaf, so as to obtain a slicing motion without any material compression or squeezing. By the construction herein shown the shape of the slot $e$ and its inclination determine the path of the knife travel. Hence any desired amount of drawing motion may be obtained. Very soft bread and cake may be smoothly and nicely sliced by this form of construction. In order to completely and smoothly slice through the crust of loaves of bread or cake, it is essential that this draw-cut be carried clear across the bottom of the loaf and the knife pass clear through the same. To obtain this result, the table is provided with longitudinal slots, a slot for each cutting-blade. The crank-shaft and supporting-rod are located below the table. The cutting-blades are journaled on the supporting-rod and oscillated by the crank-shaft. The cutting-blades are slotted and work on guides, so disposed that they move downward and backward in an elliptical orbit instead of a circular orbit. This is the preferred form of construction, the essential features being the slotted table, cutting-blade or blades supported and journaled on a rod, the blades traveling through the slots in the table, and a guide to control the movements of the blades.

By employing the slot $e$ and the guide-rod F the knife is stiffened or braced to a considerable extent against lateral vibration. The rails B also serve as guides to the forward end of the knife-blade; but the guide rod and slot direct the knife at the starting of the cut, which is the most essential portion, and with ordinary loaves of bread the material itself will serve to steady the forward motion of the blade. Another function, also incident of the guide rod and slot, which is very useful and convenient, is that they serve as a stop to limit the forward and backward travel of the knife-blade, which motion is obtained by the oscillation of the shaft or rod D through the medium of the crank-shaft and crank.

In the preferred form of construction the rails B are made, say, one-quarter of an inch thick, and when a series of knives are employed for multiple slicing a knife is provided for each slot and the slices will all be one-quarter of an inch thick. If now it is desired to make slices one-half inch in thickness, every other knife is removed. Thus I am able to obtain in a single cutter a graded thickness of slices according to the mounting of the knives upon the rod or the distance set apart from each other. It will be obvious that this same principle of construction is adapted to the use of a single knife for successively slicing a loaf, except that the thickness of slices will be determined by the judgment of the operator instead of being fixed or graded, as when a plurality of knives are employed.

G represents an adjustable guide for supporting the bread.

Mode of operation: The operator places the loaf on the rails of the table B, adjusted longitudinally to the position of the knives, and bearing against the guide G oscillates the crank so as to hold the knife or knives practically in a vertical position. The bread is placed with its rear edge a little distance from the knives. Then the crank is turned to throw the knives forward and downward, the operation of the parts being such that a draw cut is obtained and the blades pass from heel to point clear through the bread, passing down the slots between the rails, producing a clean shaving and a draw cut, which is partially obtained by the slipping of the knife journaled on the crank-rod caused by the guiding instrumentalities actuating the knife.

Having described my invention, what I claim is—

1. In a bread-slicer, the combination with a slotted table of an oscillating crank journaled to the frame, a slicing-blade journaled at the heel thereof upon the center at the free end of the crank-arm, guiding instrumentalities on the table and connected with a longitudinal guide on the knife-blade, and means for oscillating the crank-arm, whereby the knife is drawn from a vertical position above the table downwardly and laterally below the surface of the table, substantially as described.

2. In a bread-cutter, a frame, a slotted platform, an oscillating crank-shaft, a driving and a driven crank-arm, a knife-blade having one end projected through the slot and journaled upon the free end of said driven arm, and a guide on the frame engaging the blade, adapted to diminish the angle formed by the blade and crank-arm during the cutting action, whereby the blade is given a drawing motion across the platform and carried through the slot, substantially as described.

3. A slicer consisting of a slotted table, a rod, said rod connected to a crank-shaft, one or more knives journaled on said rod provided with a guide-slot and guide-rod passing through said slot giving vertical and longitudinal motion to the knife-blades as they are moved in the arc of a circle, substantially as described.

4. A slicer consisting of a slotted table, a crank-shaft and rod journaled thereto, one or more knives journaled on said rod provided with a guide-slot, and a guide-rod passing through said slot giving vertical and longitudinal motion to the knife-blade as it is carried through the arc of a circle to sever the loaves and to serve as a stop to limit the travel of the knife, substantially as described.

5. A slicer consisting of a slotted table, a crank-shaft journaled below the table, one or more knives journaled on the crank, guiding instrumentalities formed on the blade of the knife and on the table, and so disposed as to give the knife-blade an independent movement on the crank-rod as it is moved through the arc of a circle, thereby giving the knife a drawing movement longitudinally through the slots of the table in addition to the drawing movement due to the crank-rod, substantially as described.

6. In a bread-cutter, a frame, a slotted platform, an oscillating crank-shaft, a driving and a driven crank-arm, a knife-blade having one end journaled upon the free end of the driven arm under the platform, the other end extending upwardly through the slot at its initial position, pin-and-slot guiding devices connecting the blade to the frame, serving to give the blade a drawing motion in its travel through the slot, substantially as described.

In testimony whereof I have hereunto set my hand.

JOSEPH S. SACKETT.

Witnesses:
OLIVER B. KAISER,
C. M. THOMPSON.